United States Patent [19]
Kavli et al.

[11] Patent Number: 5,349,865
[45] Date of Patent: Sep. 27, 1994

[54] WIDE-PRESSURE-RANGE, ADAPTABLE, SIMPLIFIED PRESSURE TRANSDUCER

[75] Inventors: Fred Kavli, Santa Barbara; Kyong M. Park, Thousand Oaks, both of Calif.

[73] Assignee: Kavlico Corporation, Los Angeles, Calif.

[21] Appl. No.: 114,000

[22] Filed: Aug. 30, 1993

[51] Int. Cl.⁵ .................................................. G01L 9/12
[52] U.S. Cl. .................................. 73/724; 73/718; 73/756; 361/283.4
[58] Field of Search ..................... 73/724, 718, 756; 361/283.1, 283.2, 283.3, 283.4

[56] References Cited

U.S. PATENT DOCUMENTS

| | | | |
|---|---|---|---|
| 4,227,419 | 10/1980 | Park . | |
| 4,388,668 | 6/1983 | Bell et al. | 361/283 |
| 4,398,426 | 8/1983 | Park et al. . | |
| 4,617,607 | 10/1986 | Park et al. . | |
| 4,823,603 | 4/1989 | Ferran et al. | 73/708 X |
| 4,888,662 | 12/1989 | Bishop | 73/724 X |
| 5,020,377 | 6/1991 | Park | 73/724 X |

Primary Examiner—Richard E. Chilcot, Jr.
Assistant Examiner—Joseph L. Felber
Attorney, Agent, or Firm—Poms, Smith, Lande & Rose

[57] ABSTRACT

A radically simple, reliable, inherently accurate, intrinsically wide-pressure-range adaptable, low to ultra-high pressure capable capacitive transducer is made from a reference capacitor and a variable capacitor, one electrode of each of which is formed of a flat conductive layer on a circular insulating plate. The reference capacitor electrode is a peripheral annulus surrounding the central disk constituting the variable capacitor electrode. The insulating plate is rigidly held slightly spaced apart from a flat, flexible metal diaphragm which provides the opposing electrode for each capacitor. The diaphragm is an integral part of a pressure fitting which includes a fluid pressure input coupling and a pressure chamber adjacent to the diaphragm. Changes in the fluid pressure cause deflections of the diaphragm which alter the capacitance of the variable capacitor formed by the metal diaphragm as one electrode and the conductively coated disk as the other electrode, which is the variable-capacitor electrode on the central disk of the rigid insulating plate. The changes in capacitance can be detected by standard electronic circuits and calibrated to provide a measure of the changes in the fluid pressure.

24 Claims, 2 Drawing Sheets

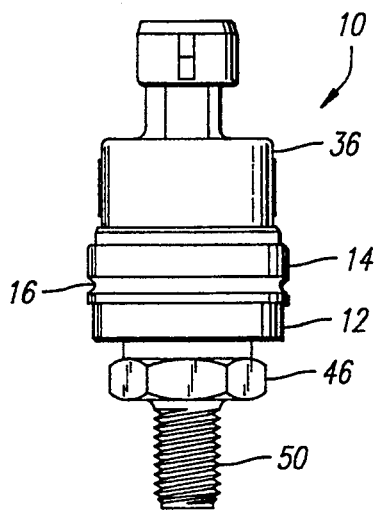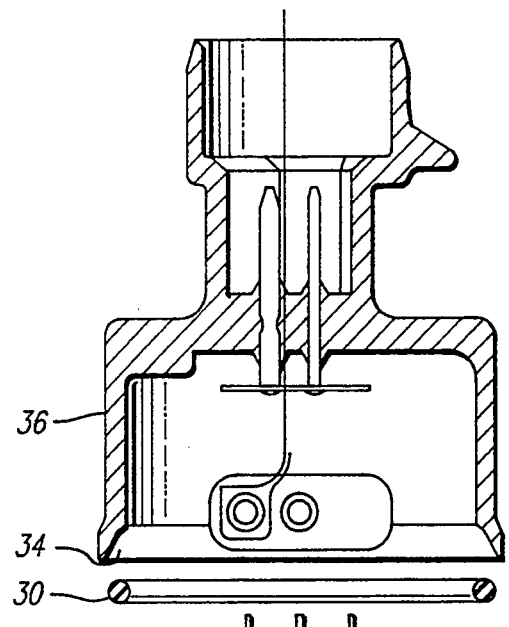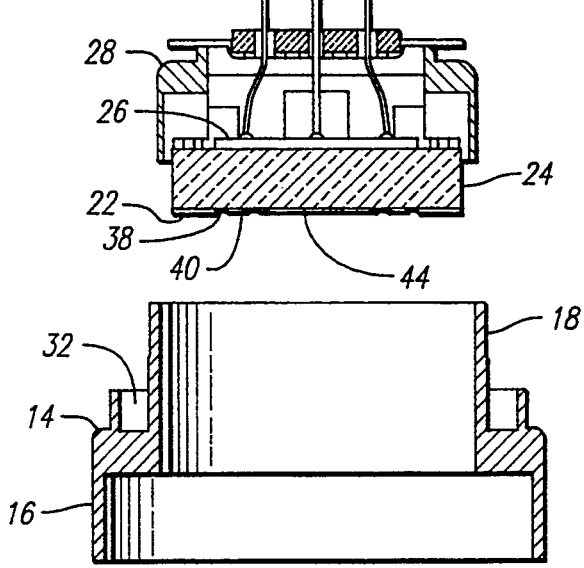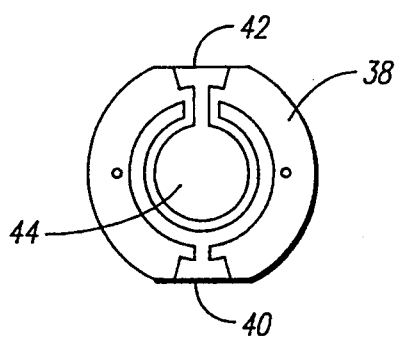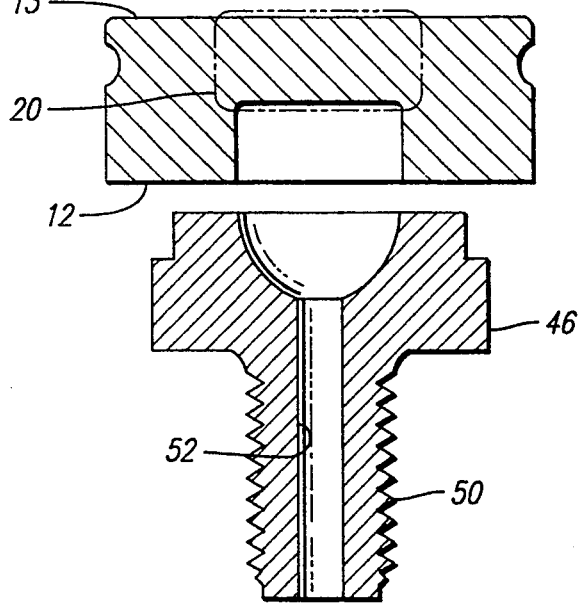

WIDE-PRESSURE-RANGE, ADAPTABLE, SIMPLIFIED PRESSURE TRANSDUCER

FIELD OF THE INVENTION

This invention relates to a new class of simplified pressure transducers, of a type easily and inexpensively manufactured, and yet incorporating novel design principles which render them inherently accurate and adaptable for measuring pressures ranging from low to ultra-high, i.e. up to the order of 22,000 psi or more.

BACKGROUND OF THE INVENTION

Initially, reference is made to the capacitive pressure transducer assemblies and circuitry shown in U.S. Pat. No. 4,388,668 granted Jun. 14, 1983, U.S. Pat. No. 4,398,426, granted Aug. 16, 1983 and U.S. Pat. No. 4,227,419, granted Oct. 14, 1980, all of which are assigned to the assignee of the present invention. In the transducers shown in these patents, a thin diaphragm of low hysteresis insulating material, such as a ceramic such as alumina, is employed; and when pressure is applied to the diaphragm it flexes toward an adjacent base member, normally of the same material, and conductive layers forming electrodes on the facing surfaces change their spacing, thereby varying the capacitance between the two conductive-layer electrodes. Circuitry included in the transducer converts the capacitance changes to an electrical signal varying linearly with the pressure changes. These pressure transducers are relatively inexpensive and have been widely used in automotive control and other applications.

Transducers for pressure ranges up to about 1000 psi have been made using substantially the arrangements shown in the above cited patents. However, at pressures substantially above 1,000 psi, corresponding to more than 60 or 70 atmospheres or bars, standard low pressure transducer configurations are not entirely practical, as the pressure seals and other components cannot handle the very high pressures.

An effective high pressure transducer operable up to about 10,000 psi, is disclosed in U.S. Pat. No. 4,617,607, granted Oct. 14, 1986, and also assigned to the assignee of the present invention. In that transducer the pressure is primarily absorbed by a relatively thick insulating diaphragm which is hermetically sealed outside of the high pressure fluid by means of a thin metal diaphragm which is substantially coextensive with and in contact with the thick insulating diaphragm, and welded or otherwise bonded to the fitting which includes the high pressure chamber connected to the source of high pressure fluid.

However, at the even higher pressures handled by the present transducer, the compressive strength of the ceramic insulating diaphragm may be inadequate; therefore, the type of high-pressure transducer based on the principles disclosed in U.S. Pat. No. 4,617,607 may not be entirely suitable for such high pressures without significant improvement. Such an improvement was disclosed in co-pending application of Ser. No. 08/057,541, assigned to the same assignee as the present invention.

Nevertheless, there remain possible improvements in the entire category of the transducers covered by all of the above-cited prior patents and co-pending patent application.

For example, it would be desirable if the manufacturing procedures required to produce the transducers were simpler and less expensive.

Finally it would be desirable if a single generic design were developed which was intrinsically adaptable by simple modifications to be applicable to any pressure in the range from low pressures to rather high pressures, bordering on ultra-high pressures.

Accordingly it is an objective of the present invention to attain simultaneously the following three desiderata:

1. inherent accuracy intrinsic to design;
2. reduced complexity and cost of manufacture;
3. adaptability to the entire range of low to ultra-high pressures.

SUMMARY OF THE INVENTION

In accordance with the present invention there is provided a simplified capacitive transducer in which one face of the variable capacitance capacitor is provided by a flat, flexible, metal diaphragm, whereas the opposing face is provided by a conductive layer coated onto an insulating plate. The diaphragm and the opposing flat electrode provided by the conductive layer constitute a variable capacitor, whose capacitance varies as the diaphragm flexes toward the flat electrode in response to increases in fluid pressure in a fluid chamber which abuts the external side of the diaphragm.

In more detail, this radically simple, reliable, inherently accurate, intrinsically wide-pressure-range adaptable, low to ultra-high pressure capable capacitive transducer is made from a reference capacitor and a variable capacitor, one electrode of each of which is formed of a flat conductive layer on a circular insulating plate. The reference capacitor electrode is a peripheral annulus surrounding the central disk constituting the variable capacitor electrode. The insulating plate is rigidly held slightly spaced apart from a flat, flexible metal diaphragm which provides the opposing electrode for each capacitor. The diaphragm is an integral part of a pressure fitting which includes a fluid pressure input coupling and a pressure chamber adjacent to the diaphragm. Changes in the fluid pressure cause deflections of the diaphragm which alter the capacitance of the variable capacitor formed by the metal diaphragm as one electrode and the conductively coated disk as the other electrode, which is the variable-capacitor electrode on the central disk of the rigid insulating plate. The changes in capacitance can be detected by standard electronic circuits and calibrated to provide a measure of the changes in the fluid pressure.

In accordance with supplemental aspects of the assembly, the transducer assembly has peripheral spacing arrangements to hold the face of the capacitive plates about ½ mil to 20 mils from the metal diaphragm; a plastic electrical output housing, and a metallic intermediate housing having circular flanges which may be deformed (1) to maintain the ceramic disk in engagement with the metal diaphragm and (2) to engage and retain the plastic output housing as part of the transducer assembly.

The resultant assembly is simple, inexpensive to manufacture, and applicable to the measurement of a wide range of pressure from about 10 psi to about 22,000 psi, using different thicknesses of the metal diaphragm.

Other objects, features, and advantages will become apparent from a consideration of the following detailed description and from the accompanying drawings.

BRIEF DESCRIPTION OF THE DRAWINGS

FIG. 1 is an exterior side view of the transducer of the present invention;

FIG. 2 is an exploded cross-sectional view of the transducer of FIG. 1;

FIG. 4 is a horizontal planar view of the underside of the insulating diaphragm upon which a reference capacitor and a variable capacitor are coated as thin-layer conductive electrodes.

DETAILED DESCRIPTION OF PRESENTLY PREFERRED EMBODIMENT

Figure 3:
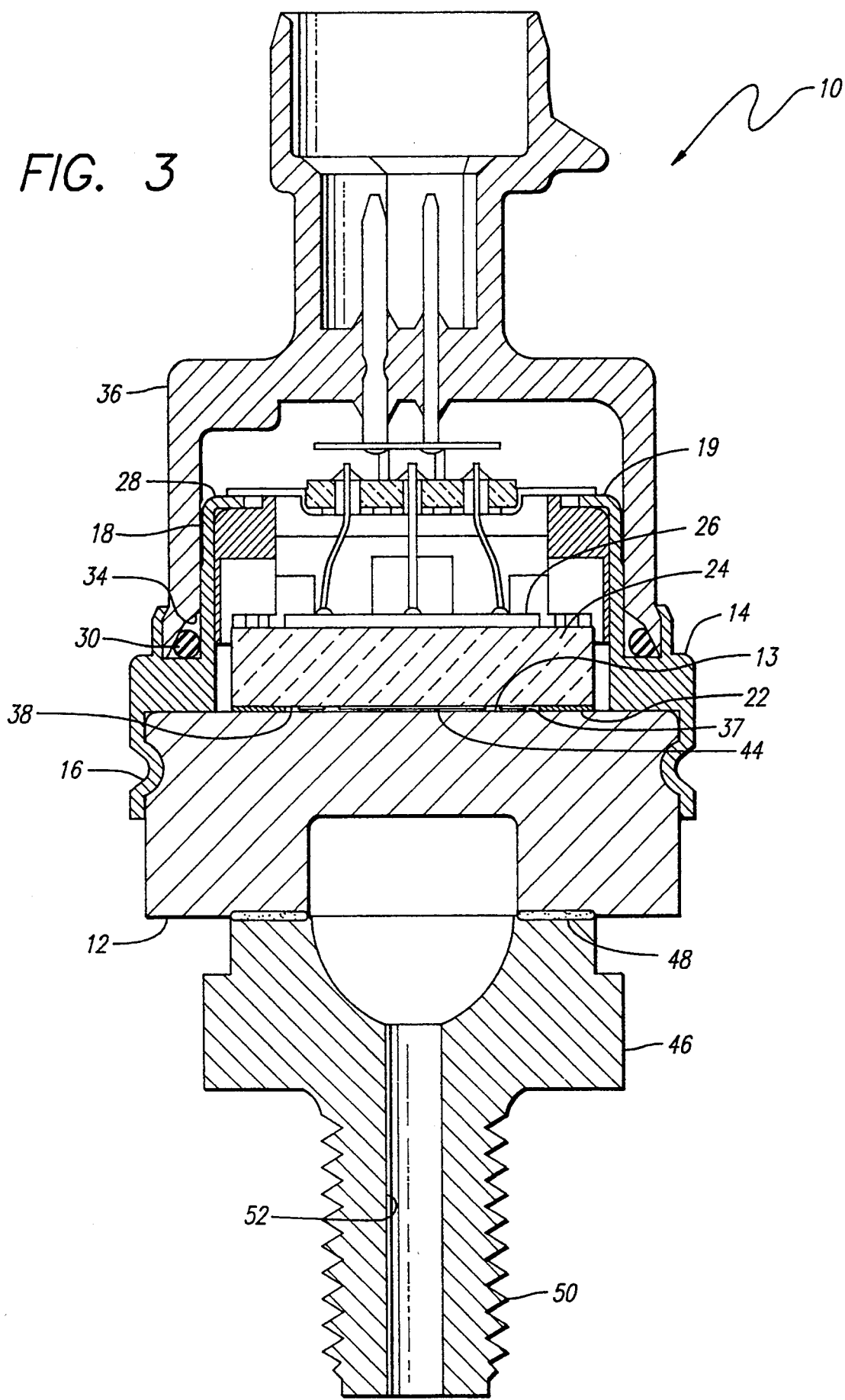
FIG. 3 is an assembled cross-sectional view of the transducer of FIG. 1.

Referring more particularly to the drawings, FIG. 1 shows an external side view of one presently preferred embodiment of the simplified capacitive pressure transducer 10 of the present invention.

Referring also to the exploded cross-sectional view of FIG. 2 and the assembled cross-sectional view of FIG. 3, note the upper component 12 of the pressure input coupling composed of the joining of component 12 with the lower component 46 by means of a friction weld 48 to constitute a solid integral unit. The lower component 46 can be attached to the pressure source (not shown) by means of the threaded arrangement 50, which is facilitated by the hexagonal external configuration of component 46 depicted in FIG. 1. The lower extremity of this input coupling provides a channel 52 by means of which the fluid whose pressure is to be measured may enter the pressure chamber 53 formed by the dead end of the channel 52 in a concave cavity 53 formed in the bottom of upper component 12. The region of component 12 shown in phantom "pillbox" shape 20 (FIG. 2) is the flexible metal diaphragm whose deflection by variations in the fluid pressure alters the variable capacitance by means of which the pressure is to be measured.

The upper face 13 of the component 12 is to be spaced very slightly apart from the bottom face 38 of the insulating plate 24 by spacer means 22. In one variation of the preferred embodiment the spacer means is a glass frit. When glass frit is employed, it may be applied by screen printing onto the insulating disk, and then fixed. In another variation of the preferred embodiment the spacer means is a thin, washer-shaped steel shim, which enables enhanced uniformity of spacing to be achieved. This close placement leaves a very thin cavity 37 between the upper face 13 of the metal diaphragm and input coupling component and the lower face 38 of the insulating plate 24. This spacing may, for example, be on the order of from 0.0005 to 0.020 inch.

As is well-known in this art, the insulating plate 24 has formed upon its lower face 38 two electrodes 40 and 44 of the shape depicted in the horizontal view of FIG. 4 These electrodes are formed of very thin layers of conductive coatings. The outer, ring-shaped electrode 40 provides (together with the metal diaphragm inside phantom box 20) a reference capacitor. Since the periphery of the upper face 13 does not deflect significantly, the capacitance of the reference capacitor 40 changes only slightly as compared to variable capacitor 44.

The metal diaphragm inside phantom box 20 has an almost identical area to that of the top of the pressure chamber and to that of the variable capacitor electrode 44. When the fluid pressure changes, the deflection of the metal diaphragm alters the capacitance between itself and the electrode 44 in a manner which can be detected via conductor 42 and its connections (not shown) to the standard electronic circuitry 26, which is well known in this art, and is normally attached to the external face of the rigid insulating plate 24. The inner housing structure 28, preferably of metal, contains this circuitry, typically a hybrid PCB, and fits over the top part of the insulating plate 24. When downward pressure is brought to bear, as will be explained below, upon the top of inner housing 28, this constrains the bottom face 38 of plate 24 to be fixed in as close a juxtaposition to the upper surface 13 as permitted by the spacer means 22. In the drawings the thickness of the flat electrodes 40 and 44 is exaggerated for visibility, as is the height of the shallow cavity 37 of which the flat electrodes constitute the major portion of its roof.

The inner housing 28 is fastened to the pressure input coupling component 12 by means of outer housing 14, preferably of metal. The lower cylindrical portion 16 of outer housing 14 fits over the upper cylindrical portion of component 12, and is fastened permanently to component 12 by means of a crimp imposed upon 16 which causes it to fit into a semi-toroidal groove (not numbered) around the upper part of component 12, as can be seen in FIG. 3 at the location marked 16. Similarly the cylindrical upper portion 18 of outer housing 14 is crimped over the top portion of inner housing 28 as depicted in location 19 in FIG. 3. As a result of these two crimpings, the plate 24 is locked firmly into close juxtaposition to the metal diaphragm inside phantom box 20 and the upper face 13 of the upper component 12 of the pressure input coupling formed of the integral unification via weld 48 of the upper fitting component 12 and the lower fitting component 46.

The transducer is completed with provision for connector pins (not numbered) to the electronics 26 to be attached by means of the upper housing 36. Preferably this housing is of engineered plastic, but in an alternative embodiment it can be made of metal or of composite materials. To seal off the electronics 26, an elastic O-ring 30 is inserted into the peripheral annular cavity 32, after which the O-ring 30 is compressed by insertion of the bevelled lower cylindrical edge 34 of upper housing 36. This upper housing is then locked into position by the crimping of the outer wall of annulus 32, which fits over and holds down the lower flared edge 34 of upper housing 36.

Thus the entire transducer can be assembled into a rigid, fluid-pressure-tight and airtight unit by means of one pre-assembly friction weld and three elementary crimpings during assembly.

The resultant simplified capacitive pressure transducer meets the three simultaneously desired characterization criteria specified in the background discussion as an unmet need, and is radically simpler both in number and complexity of components (in comparison to capability for accuracy) than known prior art pressure transducers of this type.

Concerning the thickness of the metal diaphragm, in one case for a maximum pressure to be measured of 22,000 psi, the thickness was 0.120 inch; for a 10 psi maximum, a thickness of about 0.015 inch would be used.

In conclusion it is to be understood that the foregoing detailed description, and the accompanying drawings relate to a presently preferred illustrative embodiment of the invention. However, various changes may be made without departing from the spirit and the scope of the invention. Thus, by way of example and not of limitation, the transducer per se, and the metal fitting may be made of other materials than those mentioned hereinabove. In addition, the parts need not have the precise configuration described hereinabove, but may have alternative arrangements. Further, instead of the parts being made of metal, they may in many cases be formed of high strength composite or plastic materials. Accordingly, it is to be understood that the detailed description and the accompanying drawings as set forth hereinabove are not intended to limit the breadth of the present invention, which should be inferred only from the following claims and their appropriately construed legal equivalents, rather than from the examples given.

What is claimed is:

1. A simple, reliable, inherently accurate, intrinsically wide-pressure-range adaptable, very low to ultra-high pressure capable transducer comprising:
    a capacitive pressure transducer comprised of a reference capacitor and a variable capacitor, each comprised of an electrode formed of a layer of conductive material on the same face of an insulating plate, said insulating plate having an upper surface a lower surface, said reference capacitor electrode being substantially topologically annular and peripherally disposed around said variable capacitor electrode, said variable capacitor electrode being substantially topologically disk-like and covering the central portion of said insulating plate, said insulating plate being spaced slightly apart from a thick flat flexible metal diaphragm at the outer peripheries thereof, said diaphragm being flexible under applied deflection forces to deflect toward said insulating plate and change a variable capacitance of the variable capacitor formed between said variable capacitor electrode and said diaphragm, said diaphragm being at least 0.015 inches thick, and said metal diaphragm being in mechanical coupling proximity with said insulating plate over the greater portion of the area of said variable capacitor electrode;
    a pressure fitting including a pressure input coupling for connecting to a source of pressurized fluid;
    a housing for said insulating plate peripherally constraining the electrode-bearing face of said insulating plate, essentially rigidly, to remain in close and fixed but spaced-apart proximity to the periphery of said metal diaphragm;
    peripheral, uninterrupted, annular means for spacing said insulating plate apart from but very close to said metal diaphragm, said means for spacing disposed on said lower surface of said insulating plate, whereby said means for spacing mounted on said insulating plate and directly engages said metal diaphragm;
    said variable capacitance constituting means for determining variations in the magnitude of the deflection of the central portion of said diaphragm as pressure to said pressure input coupling is varied; and
    said pressure input coupling having an upper component defining a pressure chamber, said pressure chamber adjacent to and having an extent comparable to that of said metal diaphragm, said pressure chamber and said metal diaphragm being formed from one integral body of material, said chamber being connected to said input coupling;
    whereby, when the pressure applied to said input coupling changes, the corresponding pressure change in said pressure chamber causes the deflection of said diaphragm to change correspondingly, and the resultant changed output capacitance of the transducer indicates the new pressure level.

2. A pressure transducer as defined in claim 1 wherein said insulating plate is made of alumina.

3. A pressure transducer as defined in claim 1 wherein said fitting and said metal diaphragm are made of steel.

4. A pressure transducer as defined in claim 1 wherein said metal diaphragm is not more than 0.1 inches thick and not less than 0.015 inches thick.

5. A pressure transducer as defined in claim 1 wherein the spacing between said metal diaphragm and said electrodes is between 0.0005 and 0.020 inch.

6. A pressure transducer as defined in claim 1 wherein said insulating plate and said metal diaphragm are substantially circular in configuration.

7. A pressure transducer as defined in claim 1 wherein the diameter of said metal diaphragm is in the order of 0.25 inch to 2.00 inches.

8. A pressure transducer as defined in claim 1 wherein said pressure input coupling is comprised of:
    a lower component having a channel by which fluids may be introduced to the pressure chamber;
    wherein said upper and lower components are joined by means of a friction weld to constitute a solid integral unit.

9. A pressure transducer as defined in claim 1 wherein said peripheral uninterrupted and annular means for spacing said insulating plate apart from said metal diaphragm comprises a thin peripheral layer of glass frit.

10. A pressure transducer as defined in claim 1 wherein said peripheral uninterrupted and annular means for spacing said insulating plate apart from said metal diaphragm comprises a washer-shaped thin steel shim.

11. A simple, reliable, inherently accurate, intrinsically wide-pressure-range adaptable, very low to ultra-high pressure capable transducer comprising:
    a capacitive pressure transducer comprised of an electrode formed of a layer of conductive material on an insulating plate, said insulating plate having an upper surface and a lower surface, and said insulating plate further being spaced slightly apart from a flat flexible metal diaphragm at the outer peripheries thereof, said diaphragm being flexible under applied deflection forces to deflect toward said insulating plate and change a variable capacitance of a capacitor formed between said electrode and said diaphragm;
    a pressure fitting including a pressure input coupling for connecting to a source of pressurized fluid, said metal diaphragm being integrally joined with said pressure fitting and in mechanical coupling proximity with said insulating plate over the greater portion of the area of said variable capacitor electrode;
    a housing for said insulating plate peripherally constraining the electrode-bearing face of said insulating plate, essentially rigidly, to remain in close and fixed but spaced-apart proximity to the periphery of said metal diaphragm;
    means for spacing said insulating plate apart from but very close to said metal diaphragm, said means for spacing being disposed on said lower surface of said insulating plate, whereby said means for spacing is between said metal diaphragm and said insulating plate;

said variable capacitance constituting means for determining variations in the magnitude of the deflection of the central portion of said diaphragm as pressure to said pressure input coupling is varied; and a pressure chamber adjacent to and having an extent comparable to that of said metal diaphragm, said chamber being connected to said input coupling;

whereby, when the pressure applied to said input coupling changes, the corresponding pressure change in said chamber causes the deflection of said diaphragm to change correspondingly, and the resultant changed output capacitance of the transducer indicates the new pressure level.

12. A pressure transducer as defined in claim 11 wherein said insulating plate is made of alumina.

13. A pressure transducer as defined in claim 11 wherein said fitting and said metal diaphragm are made of steel.

14. A pressure transducer as defined in claim 11 wherein said metal diaphragm is more than 0.010 inch thick.

15. A pressure transducer as defined in claim 11 wherein the spacing between said metal diaphragm and said electrode is between 0.0005 and 0.020 inch.

16. A pressure transducer as defined in claim 11 wherein said insulating plate and said metal diaphragm are substantially circular in configuration.

17. A pressure transducer as defined in claim 11 wherein the diameter of said metal diaphragm is in the order of 0.25 inch to 2.00 inches.

18. A pressure transducer as defined in claim 11 wherein said metal diaphragm and said pressure fitting are integrally joined by friction welding two flat, contiguous metal surfaces.

19. A pressure transducer as defined in claim 11 wherein said means for spacing said insulating plate apart from said metal diaphragm comprises a thin peripheral layer of glass frit.

20. A pressure transducer as defined in claim 11 wherein said means for spacing said insulating plate apart from said metal diaphragm comprises a washer-shaped thin steel shim.

21. In the field of capacitive pressure transducers, wherein variations in fluid pressure mechanically induce variations in capacitance between electrodes, the improvement comprising a variable capacitor formed by the combination of a first flat electrode comprising a conductive layer coated on a substantially rigid flat insulating plate together with a second electrode comprising a substantially flat, flexible metal diaphragm, spaced slightly apart from said insulating plate by a peripheral means for spacing interposed between said metal diaphragm and said insulating plate, said diaphragm so disposed that variations in the fluid pressure to be measured deflect said diaphragm in a manner creating a variation in said capacitance between said flat electrode and said diaphragm said peripheral spacing means being disposed on a lower surface of said insulating plate.

22. An improved capacitive pressure transducer as defined in claim 21 wherein the means for spacing said insulating plate apart from said metal diaphragm comprises a thin peripheral layer of glass frit.

23. An improved capacitive pressure transducer as defined in claim 21 wherein the means for spacing said insulating plate apart from said metal diaphragm comprises a washer-shaped thin steel shim.

24. An improved capacitive pressure transducer as defined in claim 21 wherein the insulating plate and the means for spacing are biased against said metal diaphragm so that the insulating plate and the means for spacing are held firmly in close juxtaposition to the metal diaphragm.

* * * * *